April 8, 1924.

J. R. WINTER

RIM CLAMP BOLT FOR VEHICLE WHEELS

Filed Jan. 10, 1921

1,489,409

Witnesses

Inventor

By Attorney.

Patented Apr. 8, 1924.

1,489,409

UNITED STATES PATENT OFFICE.

JOHN R. WINTER, OF LANSING, MICHIGAN, ASSIGNOR TO MOTOR WHEEL CORPORATION, OF LANSING, MICHIGAN, A CORPORATION OF MICHIGAN.

RIM-CLAMP BOLT FOR VEHICLE WHEELS.

Application filed January 10, 1921. Serial No. 436,110.

*To all whom it may concern:*

Be it known that I, JOHN R. WINTER, a citizen of the United States, residing at Lansing, in the county of Ingham and State of Michigan, have invented a new and useful Improvement in Rim-Clamp Bolts for Vehicle Wheels, of which the following is a specification.

My invention relates to bolts for holding the rim clamps of vehicle wheels in position where a metallic felly band and removable rim are employed and its purposes are to make a bolt that shall be securely held in position and shall also serve as a support to the center of the rim.

Figure 1:
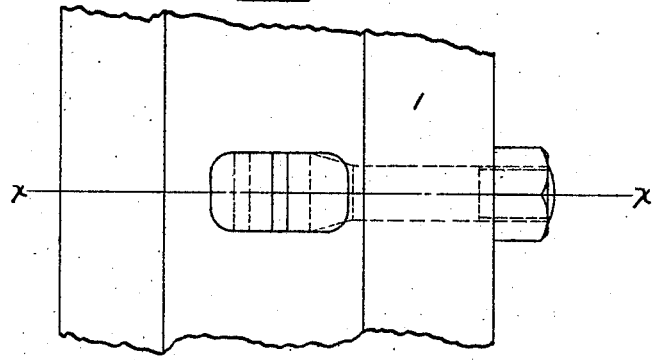
Figure 2:
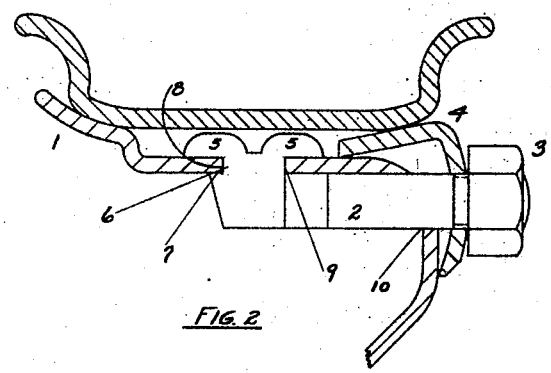
Figure 3:
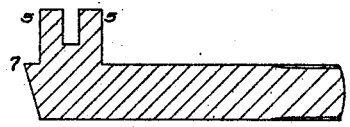

I attain these purposes by the means shown in the accompanying drawings in which Fig. 1 is a plan view of my bolt in position taken from the outside. Fig. 2 is a section along the line x—x of Fig. 1. Fig. 3 is a longitudinal section of my improved bolt ready to be placed in position.

Referring to the drawings, 1 is a metallic felly band which may be of any approved construction. 2 is the main body of my approved bolt, 3 the nut by which it is held in position and 4 the rim locking clamp. In place of the ordinary head on the bolt 2, a head formed as shown in Fig. 3 is employed, provided with two lateral wings 5 adapted to be inserted in an opening 6 formed in the rim. A shoulder 7 is formed on the outer extremity of the bolt to support the edge 8 of the opening 6. The edge 9 is supported by the main body of the bolt. If the wheel is of the disk type an opening 10 is formed in the outer side of the disk to receive the body of the bolt. To insert the bolt in place the wings 5 are inserted in the opening 6 and are then bent downward as shown in Fig. 2, so as to hold the bolt itself rigidly in position. The wings 5 when thus riveted over serve as a support to the removable rim mounted on them as shown in Fig. 2. I do not limit myself to any particular form of the wings 5.

Subject matter disclosed in this application but not claimed herein, is claimed in my copending case Serial No. 436,111, filed January 10, 1921.

I claim as my invention and desire to secure by Letters Patent:

1. The combination with a metallic felly band having an apertured portion intermediate its side edges, and a demountable rim, of means for securing the rim on the felly including a clamping bolt provided at its inner end portion with a lateral projection to engage with the apertured portion of the felly, said lateral projection having an outer part to extend above the inner face of the felly band, said outer part being adapted to be pressed over the face of the felly to lock the bolt to the felly band and to form a support for the demountable rim.

2. The combination with a metallic felly band having an apertured portion intermediate its side edges, and a demountable rim, of means for securing the rim on the felly band including a clamping bolt provided at its inner end portion with a lateral projection adapted to have an interlocking engagement with the apertured portion of the felly band and to project above the felly band and form a support for the demountable rim.

3. The combination with a metallic felly band having an apertured portion intermediate its side edges, and a demountable rim, of means for securing the rim on the felly band including a clamping bolt provided at its inner end portion with a lateral projection to engage the apertured portion of the felly band, said lateral projection having an outer part to extend above the inner face of the felly band, said outer part being split providing separate portions adapted to be pressed over the face of the felly band to secure the bolt to the felly band.

4. The combination with a felly band having an apertured portion intermediate its side edges, and a demountable rim, of means for securing the rim on the felly including a clamping bolt provided at its inner end portion with a lateral projection to engage with the apertured portion of the felly band, said lateral projection having an outer part to extend above the inner face of the felly band, said outer part being split providing separate portions adapted to be pressed over the face of the felly band to secure the bolt to the felly band and to form a support for the demountable rim.

5. The combination with a metallic felly band having an apertured portion intermediate its side edges, and a demountable rim, of means for securing the rim on the felly including a clamping bolt provided at its inner end portion with a lateral projection to engage with the apertured portion of the felly band, the lateral projection having an outer part to extend beyond the outer face of the felly band, said outer part having spaced portions adapted to be pressed down against the felly band to lock the parts together.

JOHN R. WINTER.

Witnesses:
C. M. RULE,
C. E. HORN.